United States Patent [19]
Renk

[11] 3,840,036

[45] Oct. 8, 1974

[54] SAFETY DEVICE FOR VEHICLES, PARTICULARLY MOTOR VEHICLES, FOR AUTOMATICALLY SWITCHING OFF THE CURRENT SUPPLY OR SHUTTING OFF THE FUEL LINE

[75] Inventor: Rolf Renk, Russelsheim, Germany

[73] Assignee: General Motors Corporation, Detroit, Mich.

[22] Filed: June 7, 1973

[21] Appl. No.: 367,731

[30] Foreign Application Priority Data
July 5, 1972   Germany............................ 2232957

[52] U.S. Cl................ 137/38, 74/514, 116/114 AH, 137/45, 180/104, 200/61.45 M
[51] Int. Cl........................................... F16k 17/36
[58] Field of Search............. 74/71, 71.1, 71.2, 514; 116/114 D, 114 AH; 123/198 DB; 137/38, 137/39, 43, 45; 180/104; 200/61.45 M; 251/65; 340/261

[56] References Cited
UNITED STATES PATENTS

| | | | |
|---|---|---|---|
| 2,158,753 | 5/1939 | Hansen................................. | 137/45 |
| 3,097,272 | 7/1963 | Hautly......................... | 200/61.45 M |
| 3,270,763 | 9/1966 | Kiefer....................................... | 251/65 |
| 3,521,652 | 7/1970 | Reeks..................................... | 137/38 |
| 3,545,282 | 12/1970 | Kennedy et al....................... | 73/514 |
| 3,746,028 | 7/1973 | Doyle..................................... | 137/38 |

*Primary Examiner*—Robert G. Nilson
*Attorney, Agent, or Firm*—Richard G. Stahr

[57] ABSTRACT

A safety device for vehicles powered by easily ignitable fuel which automatically shuts-off the fuel line or switches off the electric current supply by the mass inertia of an actuating element upon attainment of a certain deceleration of the vehicle. Upon an impact the actuating element overcomes a spring resistance between two plates, one of which is a magnet whilst the other is of a ferro-magnetic material. With the spring resistance overcome, one of the plates, forming the closure member of a shut off valve in the fuel line, is moved towards the other plate forming the seat of said valve, and the plates are then held in contact with each other by the magnetic force effective between them. The valve also incorporates a movable bushing which together with a ball forms an axially movable non-return valve. The fuel line is held shut by the magnetic force until by manual operation of a piston in a cylinder fuel supply is again restored. The device may also be applied to a switch for interrupting the electric current supply.

6 Claims, 9 Drawing Figures

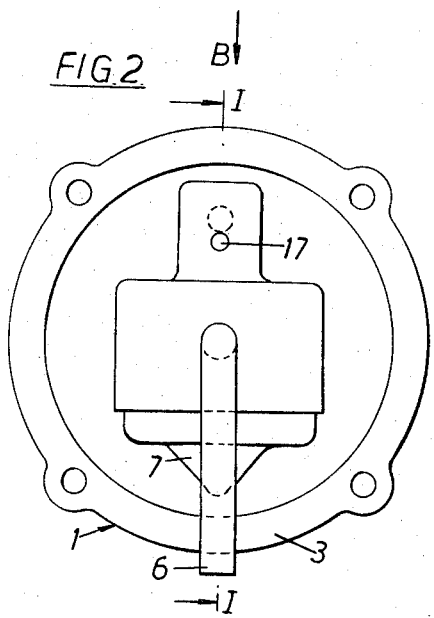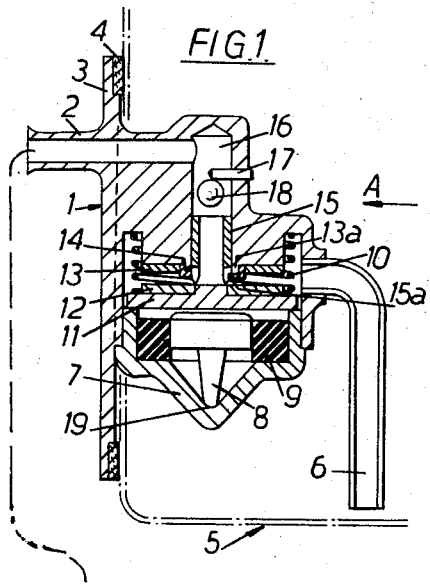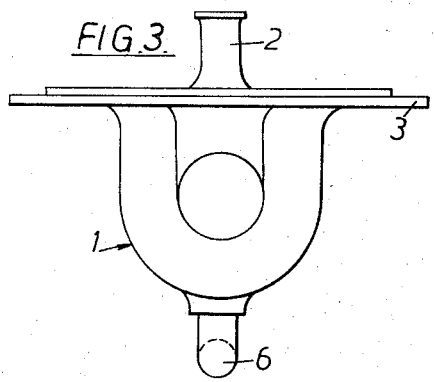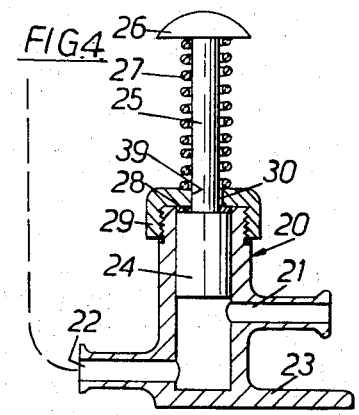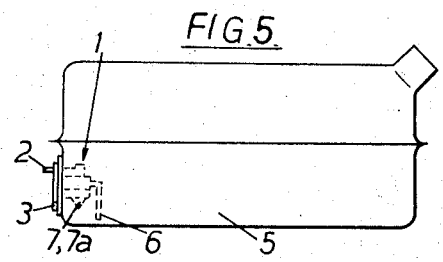

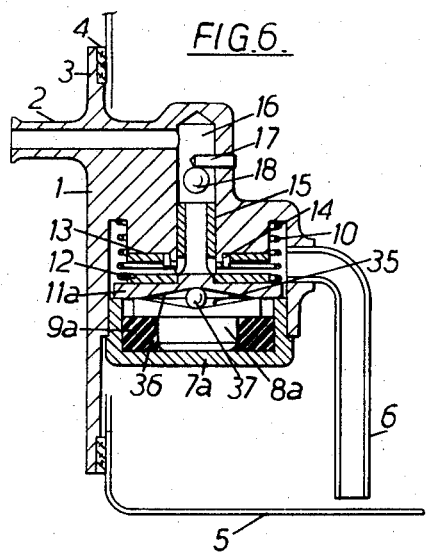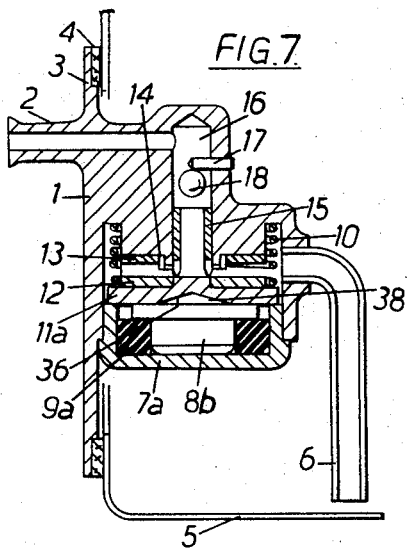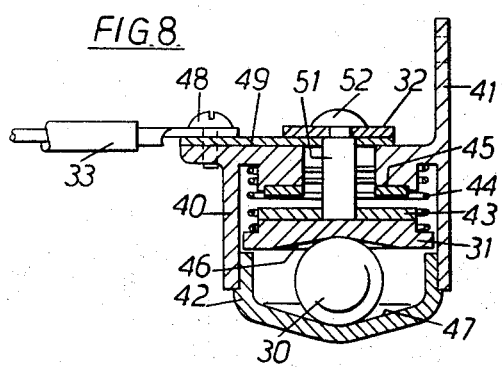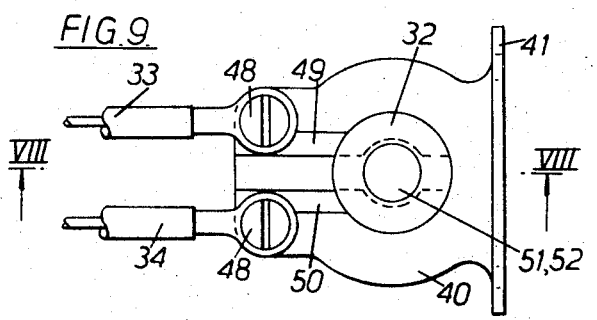

SAFETY DEVICE FOR VEHICLES, PARTICULARLY MOTOR VEHICLES, FOR AUTOMATICALLY SWITCHING OFF THE CURRENT SUPPLY OR SHUTTING OFF THE FUEL LINE

The present invention relates to inertia-operable safety devices for vehicles, particularly motot vehicles, powered by easily ignitable fuel, such devices either switching off the electric current supply or shutting off the fuel line running from the fuel tank, the switch-off or other shut-off action being initiated automatically by the mass inertia of an actuating element, upon attainment of a certain deceleration of the vehicle.

The risk of motor vehicles catching fire in the event of accidents, is due almost entirely to escaping petrol and short-circuits in the electrical wiring system. Attempts have already been made known to eliminate these additional items of danger arising as the consequence of an accident. German Specification DOS No. 2,143,821, for example, has publicly disclosed a device for automatically switching off the current supply. This known safety device operates in a complicated and expensive manner with diodes, relay coils, relay contacts and ignition switches. These elements are switched in a certain manner and are releasable in the sense of a current interruption by means of an impact switch reacting to the vehicle deceleration.

A device for shutting off the fuel line has been made known, for example, by U.S. Pat. Specification No. 3,610,263. Here, a ball, freely movable by inertia forces, is arranged in a valve housing. The ball constitutes a closure member which, in the event of severe decelerations, comes into engagement with a correspondingly spherical valve seat. Further, an alternative embodiment takes the form of a conical valve plate guided on a rod, and a correspondingly conical valve seat. The disadvantage of this known shut-off device is that the valve member remains forced into the valve seat for only as long as the particular deceleration of the vehicle continues. Immediately after an accident involving impact of the vehicle, the shut-off valve is opened again, and fuel is able to flow out of the tank.

The problem of the present invention is to create a less expensive, uncomplicated and operationally reliable shut-off device of the above-mentioned kind which will obviate the defects characteristic of the prior art described and which will, in its basic principle, be suitable for switching off the current supply or for shutting off the fuel line. According to its basic concept, the invention solves this problem by providing that two plates normally spaced apart from each other by spring effort are arranged in a casing, one of the plates being a magnet whilst the other one consists of a ferro-magnetic material, and that one plate is movable so far towards the other plate by means of an actuating member, whilst overcoming spring resistance, that the magnetic force effective between the two plates is sufficient to keep them in contact with each other.

It is true that the impact switch according to the already quoted German Specification DOS No. 2,143,821 operates with magnetic contact elements. Here however, in the normal condition one contact (a ball contact) consisting of ferro-magnetic material is kept continuously in touch with the other magnetic contact against spring resistance, with the aid of this second magnetic contact. The magnetic force must then be overcome by the mass inertia of the ball contact during intense deceleration of the vehicle, this then breaking a circuit which thereupon sets the actual current switch-off device into operation. Apart from the fact that the known impact switch serves solely as a release element for the actual current switch-off whereas the device according to the present invention is itself suitable for the current switch-off, the present device has a further essential advantage: Here, in the normal condition the magnetisable plate is not in contact with the magnetic plate. On the contrary, this contact is only established during severe decelerations of the vehicle (collision accidents, etc), but then it is maintained with the same effectiveness even after the decline of this deceleration. This means that the current supply or the fuel line remain switched off or cut off as the case may be, even after the accident, until the risk of fire has been eliminated and the appropriate power supply has been switched on again by hand, assuming that the vehicle is still capable of being driven, following an accident.

According to a further feature of the invention, the actuating member is directed by resilient guiding means and is also held thereby in its normal position, when the vehicle is operating under normal conditions. Appropriately the actuating member is returnable into its initial position by the resilient guiding means, after operation of the two plates. A rubber ring which encloses the actuating member in the casing has been found successful under tests and in practice.

As already indicated above, the concept of the invention may be advantageously applied equally well to operating a current switch-off or to shutting off the fuel line. In the latter case, the fundamental concept of the invention may be advantageously developed according to a further feature of same, by providing that one stationary plate forms the seat of the valve, whilst the other plate movable against spring effort, forms its closure member. The result is that additional component parts are saved.

It was further indicated above that the safety device according to the invention should be manually returnable into its initial position. In the case of the shut-off valve, this means the opening of a valve. However, according to a further concept of the invention this will be possible only if the fuel line from the fuel tank up to the return device, is fluid-tight. This concept may be realised in practice by arranging that the return of the shut-off valve is brought about by the residual fuel still remaining in the line, for example, by providing a non-return valve which serves to return the movable valve plate into its initial position on the actuation of a small piston pump inserted in the fuel line.

A fuel shut-off valve according to the invention comes more effectively into action, the nearer it lies in proximity to the fuel tank. Optimum protection against fire is ensured if, the shut-off valve is arranged inside the fuel tank and is flanged on to the wall of the latter from the outside. In this case, no petrol at all can pass into the fuel line portion outside the tank, in the event of a collision accident. Moreover, the wall of the tank offers the best protection for the shut-off valve itself, so that this latter remains operationally reliable.

In so far as the present safety device can be used for the switch-off of the current supply for the vehicle, two current connections may be secured to the casing of the shut-off device and joined electrically by a contact plate coupled with the movable plate.

The two connections may either be direct components of the main supply circuit or they may be components of a control circuit which is open in the normal state but can be closed by the contact plate at a certain vehicle deceleration and then breaks the main supply circuit by means of an open-circuit relay, or which — conversely — is closed in the normal state but can be opened by the contact plate at a certain vehicle deceleration and then breaks the main supply circuit by means of a closed-circuit relay.

The invention is illustrated in the drawing showing certain of its embodiments by way of example, and is explained in further detail in the following description of these embodiments.

In the drawings:

FIG. 1 shows a fuel tank shut-off valve according to the invention, in section along line I — I of FIG. 2;

FIG. 2 is a valve according to FIG. 1 in elevation, that is, seen in the direction of the arrow A in FIG. 1;

FIG. 3 is an elevation of the valve according to FIG. 1 and FIG. 2, in the direction of the arrow B in FIG. 2;

FIG. 4 is a return device for the valve according to FIGS. 1 to 3 in longitudinal section;

FIG. 5 is a fuel tank seen from the side and having a shut-off valve fitted;

FIG. 6 is another embodiment of a fuel tank shut-off valve in section corresponding to FIG. 1;

FIG. 7 is another embodiment of a fuel tank shut-off valve in section, corresponding to FIGS. 1 and 6 respectively;

FIG. 8 is a current supply switch-off device according to the invention, in section along line VIII—VIII in FIG. 9; and FIG. 9 is the switch-off device according to FIG. 8 in plan.

The tank shut-off valve (FIGS. 1 to 7) as well as the cut-off switch for the main supply circuit (FIGS. 8 and 9) are designed on similar principles, Newton's fundamental Law of Dynamics: Force = Mass × Acceleration, forms their physical basis. The most important element of both devices is a weight (actuating member) which, by being given an acceleration (or deceleration) will persist in its instant state of motion as a consequence of its inertia, and will thereby cause the response of the devices to be released. Advantageously, these devices are so constructed that a response takes place when the motor vehicle, and therefore the devices, experience an acceleration of 10 to 20 g ($g$ = the acceleration due to gravity). This corresponds approximately to an impact velocity of 20 to 30 km/hr. If the vehicle is still capable of being driven after collision, the possibility exists of bringing the safety devices back again into their operating positions by a simple manipulation.

The tank shut-off valve according to FIGS. 1 to 3, and that according to FIGS. 6 and 7, each consist of a casing 1 (appropriately of injection moulded plastic material) which has a hose connection 2 for linking up with the fuel line leading to the carburettor (not shown). Further, the casing 1 has a flange 3 with a seal 4 for attachment of the valve to the fuel tank 5 (FIG. 5). Pressed into the casing 1 is a suction pipe 6 and a covering cap 7 (FIGS. 1 to 3) or 7a (FIGS. 6 and 7).

A helical compression spring 10 forces a support plate 11 (FIGS. 1 to 3) or 11a (FIGS. 6 and 7) on which a magnet plate 12 is secured, on to the covering cap 7. Firmly connected to the casing portion 1 is a soft iron plate 13 and a rubber seal 14. The suction line 6 admits fuel to between the plates 12, 13. The plate 13, which forms a valve seat, has a central circular aperture which is entered by a collar 13a, of smaller diameter, on the casing 1. The resilient seal ring 14 is arranged in the annular gap between the collar 13a and the edge of the aperture entered by the collar. A return bush 15 with apertures 15a in the sidewall for giving passage to the fuel, is easily displaceable in a central outlet bore 16 in the casing 1, forming part of the fuel line. As shown, the bush 15 rests upon the support plate 11 by reason of its weight. A ball 18 is displaceably arranged in the bore 16, above the bush 15. Movement of the ball is limited on the one hand by the bush 15 and on the other hand by a pin 17 projecting into the bore 16. The bush and the bore together form a non-return valve which, as explained below, serves to return the movable valve plate 12 into its initial position. When the engine is running, and fuel is being drawn from the tank, the ball 18 is held in the position indicated by the pin 17, due to the flow of fuel.

A nail-shaped weight designated by 8 in FIGS. 1 to 3, serves as an actuating member for the support plate 11 with the magnet plate 12. The weight 8 rests with the tip of its stem at the lowest point 19 of a conical depression in the covering cap 7 and is held in the position indicated by means of a rubber ring 9 acting as a resilient guiding means. Now if, as the result of an accident, the actuating member 8 experiences a sufficiently high acceleration, it then tilts about point 19 and, by means of its head, it forces the support plate 11 upwards until the magnetic force between the magnet plate 12 and the soft iron plate 13 has overcome the effort of the compression spring. Now, because of the fluid-tight action between the rubber sealing ring 14 and the magnet plate 12 no fuel can pass any longer into the bore 16; nor can it pass outwards if the fuel line has been damaged. Of course, any suitable combination of materials may be chosen for the plates 12 and 13 in order to produce the magnetic force, and these latter may be correspondingly modified in shape.

If the vehicle is still capable of being driven after the accident and if the fuel line remains undamaged, the possibility exists of re-opening the shut-off valve via the return or restoring valve shown in FIG. 4 and described in greater detail later.

Two further proposals for constructing the actuating member are illustrated in FIGS. 6 and 7. In FIG. 6, the actuating member 8a as well as the support 11a each have a conical cavity 35 and 36 respectively. A ball 37 is located in between. If the actuating member 8a moves out of its mid-position, then the support plate 11a with the magnet plate 12 is lifted, via the ball 37.

In FIG. 7, the actuating member, here designated by reference numeral 8b, is provided with a cone 38 which fits exactly into the conical cavity 36 of the valve plate 11a. When the actuating member 8b is displaced, the cone 38 of same force the support plate 11a upwards along with the magnet plate 12. Just as in the embodiment according to FIGS. 1 to 3, so also with the arrangements in FIGS. 6 and 7 a rubber ring 9a serves to arrest and to restore the actuating member 8a or 8b to the normal position indicated in the drawing.

Restoration of the two plates, 12, 13 to the initial position indicated in the drawing cannot however be brought about by the rubber ring 9 or 9a. Instead, this purpose is served by a separate return device which has already been referred to above and will now be described in greater detail (FIG. 4). Essentially, the return device consists of a cylinder casing 20 which is adjoined by a hose connection 21 (carburettor side), a further hose connection 22 (fuel tank side), as well as an attachment flange 23. A piston 24 with piston rod 25 and operating knob 26 is held in the indicated position by a helical compression spring 27 whilst a sealing ring 28 prevents the emergence of fuel from the bore 39 of a pressed-on cover 29. Now if the operating knob 26 is depressed and the hose connection 21 is so closed by piston 24, then the fuel impelled by the piston 24 shifts the return bush 15, along with the ball 18 sealingly resting on the latter, downwards until the magnet plate 12 with the support plate 11 or 11a, and the soft iron plate 13 are separated again. Upon releasing the operating knob 26, the helical compression spring 27 brings the piston 24 into the working position shown, whilst the air drawn in through a groove 30, escapes again.

The device shown in FIGS. 8 and 9 is constructed in principle, in accordance with FIGS. 1 to 7, but here it serves as a switch for cutting off the main wiring system for the vehicle current supply. It is however readily conceivable to employ the device according to FIGS. 8 and 9 also as a shut-off valve in the above-described manner. This would merely require a few trifling modifications, such as matching the casing to the embodiment according to FIGS. 1 to 7, for example. Conversely of course, with appropriate modifications to the casing, it is possible to use the devices according to FIGS. 1 to 7, as a circuit breaking switch.

The switch-off device according to FIGS. 8 and 9 consists of a casing 40 with attachment flange 41 which is closed by a pressed-in covering cap 42. Within the inner space of the casing 40, a support plate 31 with a magnet plate 43 secured thereto is arranged so as to be movable against the resistance of a compression spring 44. A soft iron plate 45 lying opposite the magnet plate, is fixed in the casing 40. Actuation of the support plate 31, with the magnet plate 43 mounted thereon, is brought about by means of ball 30 which is held in the normal position indicated in FIG. 8 by means of conical depressions 46 and 47 in the carrier plate 31 and in the covering cap 42, respectively.

As will be seen particularly from FIG. 9, two current leads or connections 33, 34 are secured to the casing 40 by screw 48. Each connection 33, 34, respectively, is in electrically conducting communication with a strap 49 or 50, through a screw 48. In the position of the switch-off device shown in FIGS. 8 and 9, an electrically conducting communication is produced between the straps 49, 50, and therefore between the connections 33, 34, by means of a contact disc 32 which is secured to the support plate 31 by means of a rod 51.

The switch-off device according to FIGS. 8 and 9 now operates as follows: If the ball 30 is brought out of its indicated mid-position by inertia force, then it causes the support plate 31 with the contact disc 32 secured to it, to be forced upwards. Hence there is no longer any communication between the connection 33 which runs to minus pole of the battery and connection 34 which is grounded, and the circuit is consequently interrupted. The ball now runs back into its initial position, whilst the two plates 43, 45 remain in contact, owing to the magnetic force acting between them.

In order to attain the best effect for the switch-off device, it is preferable to keep the connection 33 as short as possible, because in the region of the switch-off device itself, this connection is not protected against short-circuiting.

By simple manual pressure on a spherical portion 52 of rod 51, resulting in the separation of both plates 43, 45 the switch-off device can be restored to the operating position again.

The switch-off device may be kept small and inexpensive provided that it does not have to carry the current for the entire electrical system, but merely a small control current whose interruption causes the break action of a closed-circuit relay over which the whole of the supply current flows.

An alternative possibility is to provide a simple design for the switch-off device, such that in the operating position the two connections 33 and 34 are broken, whereas during response of the switch-off device the connections are joined together, so that a control current interrupts an open-circuit relay over which the entire main supply current flows. This embodiment of the switch-off device provides a simple possibility of attaining the simultaneous switch-on of a flashing rearward warning system which is fed from a small emergency battery.

There are several possibilities of adjusting the shut-off valve and the switch-off device according to the invention, so that sensitivity to impact may be set: varying the thickness of the magnet plate 12 or 43, the spacing of same from the soft iron plate 13 or 45, the weight of the actuating member 8 or 8b or 8a or 30, the hardness of the helical compression spring 10 or 44, the hardness of the rubber ring 9 or 9a and the coefficient of friction between the actuating member 8, 8a, 8b, 30 and the covering cap 7, 7a or 42.

I claim:

1. An inertia-operable shut-off device for vehicles, comprising two plates arranged face to face and normally spaced apart, one plate being a magnet while the other is of ferro-magnetic material, and one plate being movable into contact with the other to effect the shut-off action; spring means loading the movable plate away from the other plate; an inertia-operable actuator member arranged to load the movable plate towards the other plate, against the spring means, responsive to a given inertia force, to the extent that the plates are held in contact by magnetic attraction; and a guide ring of resilient material surrounding the actuator member and arranged to restore it to its initial position after response to the given inertia force.

2. An inertia-operable fuel shut-off device for vehicles, comprising two plates arranged face to face and normally spaced apart, one plate being a magnet while the other is of ferro-magnetic material, and one plate being movable into contact with the other to effect the shut-off action; spring means loading the movable plate away from the other plate; an inertia-operable actuator member arranged to load the movable plate towards the other plate, against the spring means, responsive to a given inertia force, to the extent that the plates are held in contact by magnetic attraction; and a resilient device arranged to restore the actuator member to its initial position after response to the given inertia force; the stationary one of said plates forming the seat of a fuel-valve, while the movable plate forms a closure member of said valve.

3. A device according to claim 2, in which the actuator member is made of nail-like shape having a head engageable with the movable plate and a tip about which the member is tiltable under the effect of inertia force.

4. An inertia-operable fuel shut-off device for vehicles, comprising the following combination: a casing; two plates arranged face to face within the casing and normally spaced apart, one plate being a magnet while the other is of ferro-magnetic material, and one plate being movable into contact with the other to effect the shut-off action; spring means loading the movable plate away from the other plate; an inertia-operable acutator member arranged to load the movable plate towards the other plate, against the spring means, responsive to a given inertia force, to the extent that the plates are held in contact by magnetic attraction; a fuel inlet to admit fuel between the plates; and a resilient device arranged to restore the actuator member to its initial position after response to the given inertia force; the stationary one of said plates having a central fuel-flow aperture associated with a seal ring forming a valve seat; and the movable plate forming a valve closure member adapted to bear against said seat when the plates are in contact.

5. A device according to claim 4, having associated with it a plate-separator device comprising a spring-loaded manual piston and cylinder device connected to the said outlet bore of the casing so that operation of the piston provides said reverse-flow fuel.

6. An inertia-operable fuel shut-off device for vehicles, comprising the following combination: a casing; two plates arranged face to face within the casing and normally spaced apart, one plate being a magnet while the other is of ferro-magnetic material, and one plate being movable into contact with the other to effect the shut-off action; spring means loading the movable plate away from the other plate; and an inertia-operable actuator arranged to load the movable plate towards the other plate, against the spring means, responsive to a given inertia force, to the extent that the plates are held in contact by magnetic attraction; a fuel inlet to admit fuel between the plates; and a resilient device arranged to restore the actuator member to its initial position after response to the given inertia force; the stationary one of said plates having a central fuel-flow aperture associated with a seal ring forming a valve seat; the movable plate forming a valve closure member adapted to bear against said seat when the plates are in contact; the casing having a fuel-flow outlet bore registering with said aperture; said bore containing an axially displaceable one way valve arranged to pass fuel coming from said aperture but to close to fuel flowing in the reverse direction and by the pressure of said reverse-flow fuel arranged to apply pressure to the movable plate in the plate-separating direction.

* * * * *